(12) United States Patent
Coene et al.

(10) Patent No.: US 10,621,601 B2
(45) Date of Patent: Apr. 14, 2020

(54) SYSTEM AND METHOD FOR DETERMINING UTILITY COST SAVINGS

(75) Inventors: Laurent Coene, Lantau Island (HK); Edgard Franco, Barueri (BR)

(73) Assignee: SCHNEIDER ELECTRIC USA, INC., Boston, MA (US)

( * ) Notice: Subject to any disclaimer, the term of this patent is extended or adjusted under 35 U.S.C. 154(b) by 565 days.

(21) Appl. No.: 14/114,447

(22) PCT Filed: Apr. 26, 2012

(86) PCT No.: PCT/US2012/035181
§ 371 (c)(1),
(2), (4) Date: Jan. 10, 2014

(87) PCT Pub. No.: WO2012/149138
PCT Pub. Date: Nov. 1, 2012

(65) Prior Publication Data
US 2014/0114724 A1    Apr. 24, 2014

Related U.S. Application Data

(60) Provisional application No. 61/480,549, filed on Apr. 29, 2011.

(51) Int. Cl.
*G01D 4/00* (2006.01)
*G06Q 30/02* (2012.01)
*G06Q 50/06* (2012.01)

(52) U.S. Cl.
CPC .......... *G06Q 30/0203* (2013.01); *G01D 4/00* (2013.01); *G06Q 30/0202* (2013.01);
(Continued)

(58) Field of Classification Search
CPC ..................................................... G06Q 50/06
(Continued)

(56) References Cited

U.S. PATENT DOCUMENTS 5,566,084 A    10/1996  Cmar
6,697,951 B1 *  2/2004  Sinha ............... G06Q 50/06
                                                        713/300
(Continued)

FOREIGN PATENT DOCUMENTS

CN    1885361 A      12/2006
CN    201611495 U    10/2010

OTHER PUBLICATIONS

Fuller et al. (Analysis of Residential Demand Response and Double-Auction Markets, Published in: 2011 IEEE Power and Energy Society General Meeting, pp. 1-7, Available on IEEE Oct. 10, 2011).*

(Continued)

*Primary Examiner* — Brian M Epstein
*Assistant Examiner* — Matthew D Henry
(74) *Attorney, Agent, or Firm* — Lando & Anastasi, LLP

(57) ABSTRACT

A computer system for identifying utility cost savings is provided. The computer system includes a memory and at least one processor coupled to the memory. The at least one processor is configured to receive usage information gathered from at least one site via a first interface, administer a utility questionnaire via a second interface, and determine recommendation information describing a plurality of cost savings recommendations for the at least one site based on a set of responses to the questionnaire and the usage information.

18 Claims, 19 Drawing Sheets

(52) U.S. Cl.
CPC ............ *G06Q 50/06* (2013.01); *Y02B 90/245* (2013.01); *Y02B 90/246* (2013.01); *Y04S 20/40* (2013.01); *Y04S 20/42* (2013.01)

(58) Field of Classification Search
USPC ....................................................... 705/7.31
See application file for complete search history.

(56) References Cited

U.S. PATENT DOCUMENTS

| | | |
|---|---|---|
| 6,785,592 B1 | 8/2004 | Smith et al. |
| 2003/0009401 A1* | 1/2003 | Ellis .................. G06Q 30/0283 705/35 |
| 2004/0164718 A1* | 8/2004 | McDaniel ................. G05F 1/70 323/211 |
| 2006/0155423 A1* | 7/2006 | Budike, Jr. ............ G06Q 10/06 700/286 |
| 2008/0177678 A1* | 7/2008 | Di Martini ............. G01D 4/002 705/412 |
| 2009/0012916 A1 | 1/2009 | Barnett |
| 2010/0037189 A1 | 2/2010 | Bickel |
| 2010/0076615 A1* | 3/2010 | Daniel ...................... H02J 1/14 700/293 |
| 2010/0089909 A1 | 4/2010 | Besore et al. |
| 2010/0179704 A1* | 7/2010 | Ozog ............... G06Q 10/06315 700/291 |
| 2010/0274695 A1* | 10/2010 | Thomas ................. G06Q 30/04 705/34 |
| 2011/0166959 A1* | 7/2011 | Winter ................... G06Q 10/04 705/26.25 |
| 2011/0184563 A1* | 7/2011 | Foslien .............. B60H 1/00985 700/276 |
| 2012/0216123 A1* | 8/2012 | Shklovskii ......... G06Q 30/0201 715/738 |

OTHER PUBLICATIONS

International Search Report from corresponding PCT/US2012/035181 dated Aug. 1, 2012.

* cited by examiner 700 702 704 706 708

| Site | Best Rate | Power Factor | Peak Demand |
|------|-----------|--------------|-------------|
| Factory | $0.00 | $0.00 | $67,040.16 |
| Store 1 | $0.00 | $0.00 | $50,088.00 |
| Store 2 | $0.00 | $0.00 | $2,374.00 |
| Store 3 | $0.00 | $0.00 | $5,714.00 |
| Store 4 | $0.00 | $0.00 | $5,452.00 |
| Store 5 | $0.00 | $0.00 | $4,655.00 |
| Store 6 | $0.00 | $0.00 | $24,578.00 |
| Store 8 | $0.00 | $0.00 | $30,809.00 |
| Store 9 | $0.00 | $0.00 | $28,756.00 |

FIG. 7

SYSTEM AND METHOD FOR DETERMINING UTILITY COST SAVINGS

RELATED APPLICATIONS

This application is a National Stage Application under 35 U.S.C. § 371 from PCT/US2012/035181, filed Apr. 26, 2012, which claims the benefit of U.S. Provisional Application Ser. No. 61/480,549, entitled "SYSTEM AND METHOD FOR DETERMINING UTILITY COST SAVINGS," filed on Apr. 29, 2011. Both of the foregoing prior applications are incorporated herein by reference in their entirety.

BACKGROUND

Technical Field

The technical field relates generally to monitoring usage of utilities and, more particularly, to methods and systems for identifying opportunities to save costs associated with utility usage.

Background Discussion

Public utility companies offer utility service to consumers according to terms specified by government-approved tariffs. The characteristics of particular tariffs vary by utility company, but most specify characteristics of the utility service offered and a price for consuming the utility service. The price charged for consumption of a utility under one or more tariffs can vary based on a variety of factors. Some of these factors include the location to which the utility is delivered, the amount of the utility consumed, the characteristics of the utility, and the service level with which the utility is delivered. Service levels are often targeted to specific types of consumers, for example, residential, commercial or industrial consumers.

Tariffs are often structured to promote usage policy objectives, such as decreasing the overall cost of providing utility service to all consumers. For instance, to smooth demand for a utility, a utility company may structure its tariffs to offer service at relatively higher prices during periods of high demand and to offer service at relatively lower prices during periods of low demand. Similarly, a utility company may structure its tariffs such that the price for using a utility increases as a consumer's usage transgresses a series of thresholds. This tiered pricing approach discourages large scale consumption of the utility at any time.

Utility billing systems track utility consumption and issue invoices to consumers based on the tariffs that apply to the consumer's usage pattern. The consumption information processed by these billing systems may come from various sources. For example, field personnel may periodically take meter readings that measure the amount of the utility consumed and report the readings to data entry personnel who enter the meter readings into the billing system. Alternatively, electronic meters may periodically transmit meter readings to a consolidator that automatically enters the meter readings into the billing system.

SUMMARY

According to one aspect a computer system for identifying potential utility cost savings is provided. The computer system includes a memory, a processor coupled to the memory, an interface executed by the processor and configured to administer a utility questionnaire and a cost savings engine executed by the processor and configured to determine a plurality of potential cost savings recommendations for a site based on a set of responses to the questionnaire and usage information gathered from the site. The recommendations for a site may include an amount of potential cost savings. This amount of potential cost savings may be more precise and accurate than the potential cost savings produced by conventional methods. This is so because, in some examples, the calculations performed by the computer system result in actual and theoretical reconstructions of previous bills based on actual tariffs, rather than a statistical summary of past charges.

In addition, examples disclosed herein allow users to compare utility costs and potential cost saving across a plurality of sites. This comparison is particularly useful when comparing sites with similar physical layouts and equipment because corrective actions taken within sites having similar physical layouts tend to provide similar benefits.

According to another embodiment, a computer system for identifying utility cost savings is provided. The computer system includes a memory and at least one processor coupled to the memory. The at least one processor is configured to receive usage information gathered from at least one site via a first interface, administer a utility questionnaire via a second interface, and determine recommendation information describing a plurality of cost savings recommendations for the at least one site based on a set of responses to the questionnaire and the usage information.

In the computer system, the at least one processor may be further configured to present the recommendation information to an external entity. The at least one processor configured to administer the utility questionnaire may be configured to request utility information from a user via the second interface and receive the utility information from the user via the second interface. The at least one processor configured to request utility information may be configured to request location information for the at least one site, request information identifying at least one utility consumed at the at least one site, and request information identifying at least one tariff applicable to the at least one utility. The at least one processor configured to determine recommendation information may be configured to determine a plurality of theoretical contract demand values for the at least one site, compute a plurality of costs using the plurality of theoretical contract demand values, each of the plurality of theoretical contract demand values corresponding to a respective one of the plurality of costs, and include, in the recommendation information, information describing at least one of the plurality of theoretical contract demand values corresponding to a respective at least one of the plurality of costs that is lower than others of the plurality of costs.

In the computer system, the at least one processor configured to determine recommendation information may be configured to determine a power factor value for the at least one site, determine whether at least one tariff applicable to the at least one site specifies a power factor charge for the power factor value, and include, in the recommendation information responsive to determining that a power factor charge is specified, information describing the power factor charge. The at least one processor configured to determine recommendation information may be configured to determine a storable amount of a utility that can be stored at the at least one site, calculate a savings based on a consumable amount of the utility that can be consumed from the storable amount, calculate a difference between a cost of storing the storable amount and the savings, compare the difference to a threshold, and include, in the recommendation information responsive to the difference being beyond the threshold, information describing storing the storable amount.

In the computer system, the at least one processor configured to determine recommendation information may be configured to identify a plurality of tariffs applicable to the at least one site, compute a plurality of costs using the plurality of tariffs, each of the plurality of tariffs corresponding to a respective one of the plurality of costs, and include, in the recommendation information, information describing at least one of the plurality of tariffs corresponding to a respective at least one of the plurality of costs that is lower than others of the plurality of costs. The at least one processor configured to determine recommendation information may be configured to identify at least one curtailment program applicable to the at least one site, and include, in the recommendation information, information describing the at least one curtailment program. The at least one processor configured to determine recommendation information may be configured to calculate a cost of producing a producible amount of a utility that can be produced at the at least one site, calculate a savings of consuming the producible amount, calculate a difference between the cost and the savings, and include, in the recommendation information responsive to the savings being greater than the cost, information describing producing the producible amount.

In the computer system, the at least one processor configured to calculate the cost of producing the producible amount may be configured to calculate a cost of producing the producible amount using at least one of a fossil fuel based utility generation device and an alternative utility generation device. The at least one processor configured to determine recommendation information may be configured to determine an amount by which consumption of a utility can be reduced during a period of time at the at least one site, calculate a savings based on the amount and the period of time, and include, in the recommendation information, information describing the amount and the period of time. The at least one processor configured to determine the amount by which consumption of the utility can be reduced during the period of time at the at least one site may be configured to calculate a controllable load of the at least one site, identify a peak demand for the utility that occurred at the at least one site during a previous billing cycle, adjust the peak demand by the controllable load to create an adjusted peak demand, adjust demand values reported within the previous billing to not exceed the adjusted peak demand to create adjusted demand values, calculate an adjusted cost for the previous billing cycle using the adjusted demand values, and include, in the recommendation information responsive to the adjusted cost being lower than an unadjusted cost, information describing the controllable load.

In the computer system, the at least one processor configured to determine recommendation information may be configured to identify a plurality of service offerings applicable to the at least one site, compute a plurality of costs based on the plurality of service offerings, each of the plurality of service offerings corresponding to a respective one of the plurality of costs, and include, in the recommendation information, information describing at least one of the plurality of service offerings corresponding to a respective at least one of the plurality of costs that is lower than others of the plurality of costs. The at least one processor configured to determine recommendation information may be configured to calculate a difference between a cost of installing and operating new equipment at the at least one site for a period of time and a cost of operating current equipment at the at least one site for the period of time, compare the difference to a threshold, and include, in the recommendation information responsive to the difference being beyond the threshold, information describing installing and operating the new equipment. The at least one processor configured to calculate the difference between the cost of installing and operating new equipment at the at least one site for a period of time and a cost of operating current equipment at the at least one site for the period of time may be configured to calculate a difference between the cost of installing and operating new lighting at the at least one site for a period of time and a cost of operating current lighting at the at least one site for the period of time.

According to another embodiment, a method of identifying utility cost savings using a computer system is provided. The computer system includes memory and at least one processor coupled to the memory. The method includes acts of receiving, via a system interface coupled to the at least one processor, usage information gathered from at least one site, administering, via a user interface coupled to the at least one processor, a utility questionnaire, and determining recommendation information describing a plurality of cost savings recommendations for the at least one site based on a set of responses to the questionnaire and the usage information. The method may further include an act of presenting the recommendation information to an external entity.

According to another embodiment, a non-transitory computer readable medium is provided. The computer readable medium has stored thereon sequences of instruction for identifying utility cost savings. The sequences of instruction include instructions that will cause at least one processor to receive, via a system interface coupled to the at least one processor, usage information gathered from at least one site, administer, via a user interface coupled to the at least one processor, a utility questionnaire, and determine recommendation information describing a plurality of cost savings recommendations for the at least one site based on a set of responses to the questionnaire and the usage information. The sequences of instruction may include instructions that will further cause the at least one processor to present the recommendation information to an external entity.

Still other aspects, examples and advantages of these exemplary aspects and examples, are discussed in detail below. Moreover, it is to be understood that both the foregoing information and the following detailed description are merely illustrative examples of various aspects and examples, and are intended to provide an overview or framework for understanding the nature and character of the claimed aspects and examples. Any example disclosed herein may be combined with any other example. References to "an example," "some examples," "an alternate example," "various examples," "one example," "at least one example," "this and other examples" or the like are not necessarily mutually exclusive and are intended to indicate that a particular feature, structure, or characteristic described in connection with the example may be included in at least one example. The appearances of such terms herein are not necessarily all referring to the same example.

BRIEF DESCRIPTION OF DRAWINGS

Various aspects of at least one example are discussed below with reference to the accompanying figures, which are not intended to be drawn to scale. The figures are included to provide an illustration and a further understanding of the various aspects and examples, and are incorporated in and constitute a part of this specification, but are not intended as a definition of the limits of any particular example. The drawings, together with the remainder of the specification, serve to explain principles and operations of the described and claimed aspects and examples. In the figures, each identical or nearly identical component that is illustrated in various figures is represented by a like numeral. For purposes of clarity, not every component may be labeled in every figure. In the figures:

FIG. 7 is another exemplary interface display configured to provide cost savings recommendations;

DETAILED DESCRIPTION

Organizations that consume large amounts of utilities stand to reap substantial cost savings if they are able to alter their utility usage or production patterns to take advantage of lower priced tariffs. Aspects and examples disclosed herein provide utility consumers with processes and apparatus to identify and quantify actions that, if taken, will result utility cost savings. For instance, some examples described below prompt users for information regarding utility usage and process this information in conjunction with actual usage data to provide a set of utility cost saving recommendations to the user.

Examples of the methods and apparatuses discussed herein are not limited in application to the details of construction and the arrangement of components set forth in the following description or illustrated in the accompanying drawings. The methods and apparatuses are capable of implementation in other examples and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, components, elements or acts of the systems and methods herein referred to in the singular may also embrace examples including a plurality, and any references in plural to any example, component, element or act herein may also embrace examples including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Utility Cost Savings System

Figure 1:
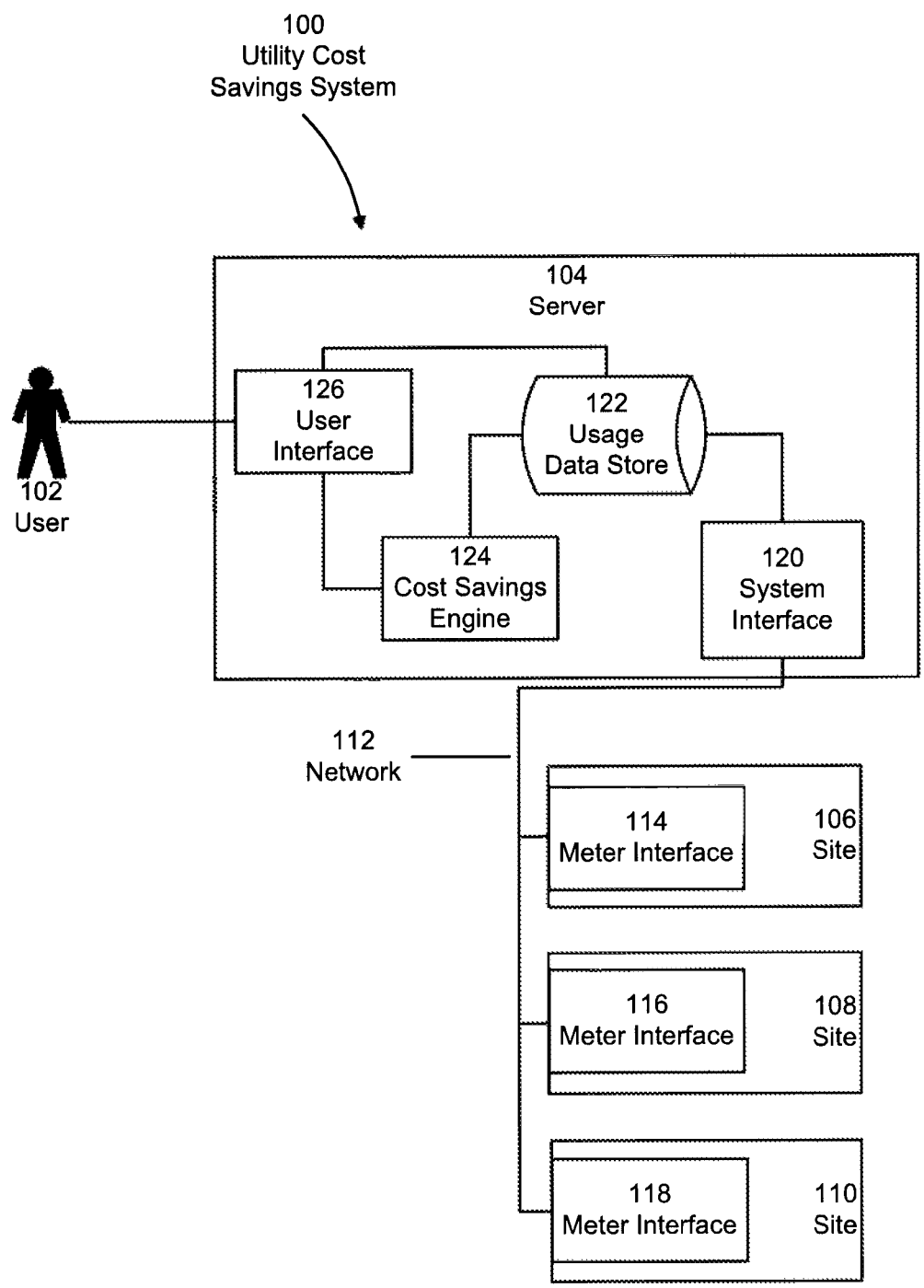
FIG. 1 is a schematic diagram of one example of a utility cost savings system.

Various examples disclosed herein implement a utility cost savings system on one or more computer systems. FIG. 1 illustrates one of these examples, utility cost saving system 100. As shown in FIG. 1, the utility cost savings system 100 includes a server 104 in data communication with three sites 106, 108 and 110 via a network 112. The sites 106, 108 and 110 include meter interface 114, 116 and 118, respectively. The server 104 includes a system interface 120, a usage data store 122, a cost savings engine 124 and a user interface 126. In this example, the server 104, the network 112 and the meter interfaces 114, 116 and 118 are implemented using one or more computer systems, such the computer systems discussed further below with reference to FIG. 2. The network 112 may include any communication network through which computer systems may exchange information. For example, the network 112 may be a public network, such as the internet, and may include other public or private networks such as LANs, WANs, extranets and intranets.

As shown in FIG. 1, a user 102 uses the user interface 126 to access the utility cost saving system 100. The user interface 126 exchanges (i.e. provides or receives) information with the cost savings engine 124 and the usage data store 122. Together, these components enable the utility cost savings system 100 to provide recommended actions for lowering utility usage costs to the user 102. Each of these components is discussed further below.

Information may flow between these components, or any of the elements, components and subsystems disclosed herein, using a variety of techniques. Such techniques include, for example, passing the information over a network using standard protocols, such as TCP/IP, passing the information between modules in memory and passing the information by writing to a file, database, data store, or some other non-volatile data storage device. In addition, pointers or other references to information may be transmitted and received in place of, or in addition to, copies of the information. Conversely, the information may be exchanged in place of, or in addition to, pointers or other references to the information. Other techniques and protocols for communicating information may be used without departing from the scope of the examples disclosed herein.

Examples of the utility cost savings system 100 are not limited to the particular configuration illustrated in FIG. 1. For instance, according to some examples, the utility cost savings system 100 is implemented using a distributed computer system, such as the distributed computer system described further below with regard to FIG. 2. Further, in at least one example, the user interface 126 is implemented using a web server that is physically and logically separate from a database server that includes the usage data store 122 and an application server that includes the cost savings engine 124 and the system interface 120. Thus, examples may utilize a variety of hardware components, software components or combinations of hardware and software components configured to perform the processes and functions described herein.

Referring again to FIG. 1, the sites 106, 108 and 110 are each associated with an entity that is responsible for financing their combined consumption of at least one utility, such as electricity, gas or water. Further, each of the sites has a meter that records utility consumption at the site. The meter interfaces 114, 116 and 118 are in data communication with the meters present within sites 106, 108 and 110, respectively. The meter interfaces 114, 116 and 118 periodically receive information from the meters that specifies a meter reading and a timestamp that indicates the time that the meter reading was taken. This periodic meter reading information may be received as a result of an unsolicited message from the meters or in response to a request issued by the meter interfaces 114, 116 and 118 to the meters. The meter interfaces 114, 116 and 118 may issue the request for meter readings according to a configured schedule or in response to a request for meter readings from the system interface 120, which is described further below. The period of elapsed time between meter readings varies between examples. For instance, in at least one example, the meter interfaces 114, 116 and 118 receive meter reading information from the meters every 15 minutes. However, examples are not limited to a particular period duration and any predetermined period of time may be used. Upon receipt of meter reading information, each of the meter interfaces 114, 116 and 118 transmits data representative of the meter reading information to the system interface 120 via the network 112.

As illustrated in FIG. 1, the system interface 120 receives the meter reading data from the meter interfaces 114, 116 and 118, acknowledges receipt of the meter reading data and stores information representative of the meter reading data in the usage data store 122. The usage data store 122 shown in FIG. 1 comprises memory or some form of data storage and provides interfaces through which other components store and retrieve usage information. In general, this usage information may include a wide variety of information regarding consumers, consumer sites and consumer usage. A non-limiting list of exemplary usage information that may be associated with a site includes an identifier of the site, location information for the site, information specifying the utilities used at the site, information specifying the tariffs that apply to the utilities used, meter reading information for the utilities, information describing how sites may alter utility consumption patterns, information specifying onsite equipment, and information specifying the physical layout of the site. The information specifying onsite equipment may indicate whether the site has a building management system, facilities for generating the utility consumed, environmental control equipment, window type and age, type of lighting, or any other equipment or physical attributes of a site that may affect the amount of the utility consumed at the site. The information specifying the physical layout of the site may include the position of the equipment and attributes of the site, including any vacant space that may be used to install new equipment, such as equipment to produce utilities.

Information within the utility cost savings system 100, including data within the usage data store 122, may be stored in any logical construction capable of holding information on a computer readable medium including, among other structures, flat files, indexed files, hierarchical databases, relational databases or object oriented databases. The data may be modeled using unique and foreign key relationships and indexes. The unique and foreign key relationships and indexes may be established between the various fields and tables to ensure both data integrity and data interchange performance.

The cost savings engine 124, as shown in FIG. 1, receives data from the usage data store 122 and analyzes the data to determine recommendations that, if followed, will reduce the overall cost of utility service to one or more sites. After determining these recommendations, the cost savings engine 124 provides data representative of the recommendations to the user interface 126. Additional exemplary processes executed by the cost savings engine 124 are described further below with reference to FIGS. 3 and 4.

The user interface 126 illustrated in FIG. 1 exchanges information with the user 102, the cost savings engine 124 and the usage data store 122. More particularly, upon receipt of an indication from the user 102 that the user 102 wishes to review utility cost savings recommendations for one or more sites, the user interface 126 prompts the user 102 for a variety of information regarding the sites. Examples of this site related information include any information maintained within the usage data store 122 described above, such as location information for the site, information indicating the utilities in use at the site, tariff information applicable to the utilities used and meter readings taken from the site. Upon receipt of responses to the prompts from the user 102, the user interface 126 stores information representative of the responses in the usage data store 122 and sends a request to the cost savings engine 124 to determine utility cost savings recommendations for the sites. Responsive to receipt of data representative of the recommendations from the cost savings engine 124, the user interface 126 presents the recommendations to the user 102. Additional exemplary processes executed by the user interface 126 are described further below with reference to FIGS. 3 and 4.

The interfaces disclosed herein, which include both system interface 120 and user interface 126, exchange information with various providers and consumers. These providers and consumers may include any external entity including, among other entities, users and systems. Each of the interfaces disclosed herein may both restrict input to a predefined set of values and validate any information entered prior to using the information or providing the information to other components. Additionally, each of the interfaces disclosed herein may validate the identity of an external entity prior to, or during, interaction with the external entity. These functions may prevent the introduction of erroneous data into the utility cost savings system 100 or unauthorized access to the utility cost savings system 100.

Computer System

As discussed above with regard to FIG. 1, various aspects and functions described herein may be implemented as specialized hardware or software components executing in one or more computer systems. There are many examples of computer systems that are currently in use. These examples include, among others, network appliances, personal computers, workstations, mainframes, networked clients, servers, media servers, application servers, database servers and web servers. Other examples of computer systems may include mobile computing devices, such as cellular phones and personal digital assistants, and network equipment, such as load balancers, routers and switches. Further, aspects may be located on a single computer system or may be distributed among a plurality of computer systems connected to one or more communications networks.

For example, various aspects and functions may be distributed among one or more computer systems configured to provide a service to one or more client computers, or to perform an overall task as part of a distributed system. Additionally, aspects may be performed on a client-server or multi-tier system that includes components distributed among one or more server systems that perform various functions. Consequently, examples are not limited to executing on any particular system or group of systems. Further, aspects and functions may be implemented in software, hardware or firmware, or any combination thereof. Thus, aspects and functions may be implemented within methods, acts, systems, system elements and components using a variety of hardware and software configurations, and examples are not limited to any particular distributed architecture, network, or communication protocol.

Figure 2:
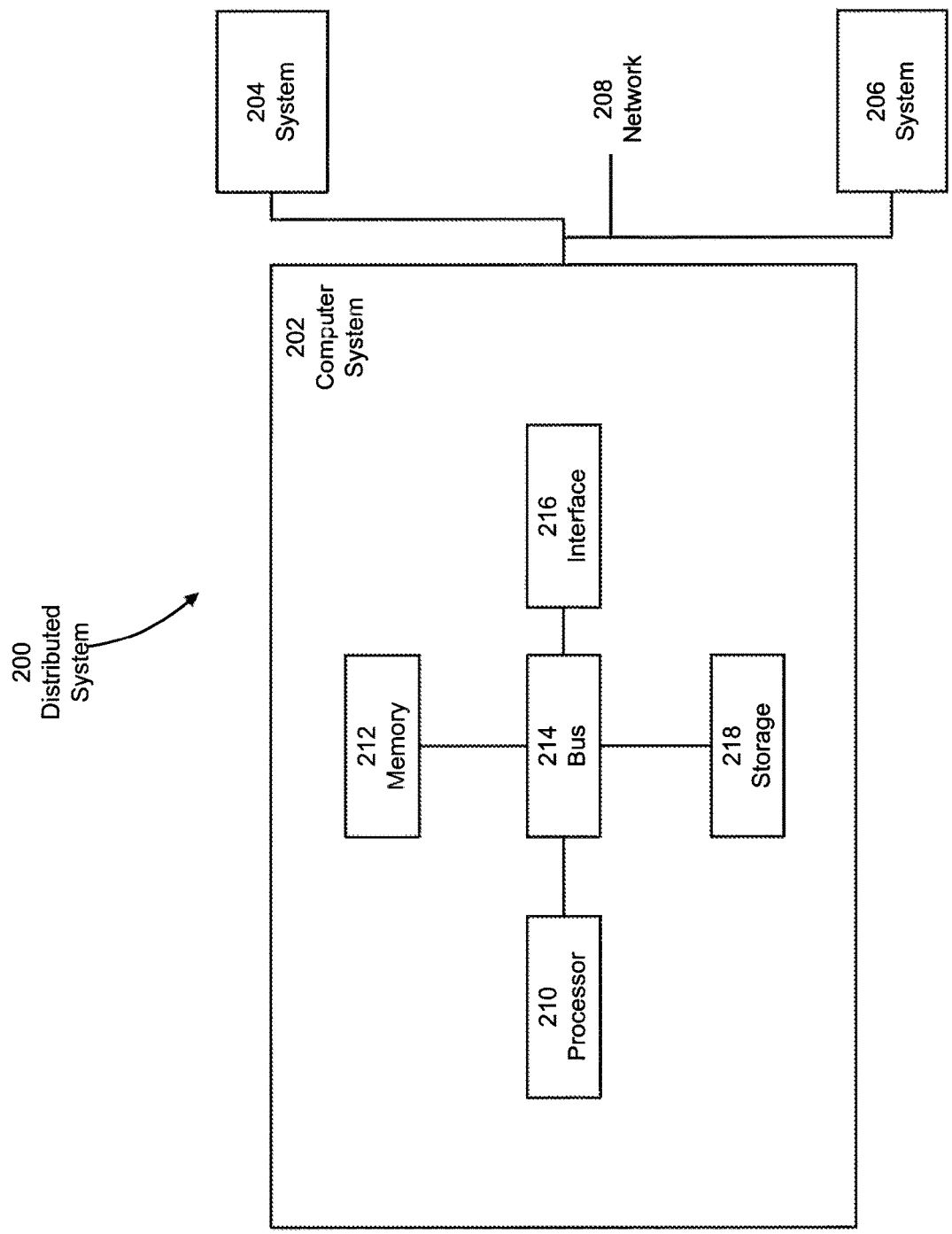
FIG. 2 is a schematic diagram of one example of a computer system that may perform processes and functions disclosed herein.

Referring to FIG. 2, there is illustrated a block diagram of a distributed computer system 200, in which various aspects and functions are practiced. As shown, the distributed computer system 200 includes one more computer systems that exchange information. More specifically, the distributed computer system 200 includes computer systems 202, 204 and 206. As shown, the computer systems 202, 204 and 206 are interconnected by, and may exchange data through, a communication network 208. The network 208 may include any communication network through which computer systems may exchange data. To exchange data using the network 208, the computer systems 202, 204 and 206 and the network 208 may use various methods, protocols and standards, including, among others, Fibre Channel, Token Ring, Ethernet, Wireless Ethernet, Bluetooth, IP, IPV6, TCP/IP, UDP, DTN, HTTP, FTP, SNMP, SMS, MMS, SS7, JSON, SOAP, CORBA, REST and Web Services. To ensure data transfer is secure, the computer systems 202, 204 and 206 may transmit data via the network 208 using a variety of security measures including, for example, TLS, SSL or VPN. While the distributed computer system 200 illustrates three networked computer systems, the distributed computer system 200 is not so limited and may include any number of computer systems and computing devices, networked using any medium and communication protocol.

As illustrated in FIG. 2, the computer system 202 includes a processor 210, a memory 212, a bus 214, an interface 216 and data storage 218. To implement at least some of the aspects, functions and processes disclosed herein, the processor 210 performs a series of instructions that result in manipulated data. The processor 210 may be any type of processor, multiprocessor or controller. Some exemplary processors include commercially available processors such as an Intel Xeon, Itanium, Core, Celeron, or Pentium processor, an AMD Opteron processor, a Sun UltraSPARC or IBM Power5+ processor and an IBM mainframe chip. The processor 210 is connected to other system components, including one or more memory devices 212, by the bus 214.

The memory 212 stores programs and data during operation of the computer system 202. Thus, the memory 212 may be a relatively high performance, volatile, random access memory such as a dynamic random access memory (DRAM) or static memory (SRAM). However, the memory 212 may include any device for storing data, such as a disk drive or other non-volatile storage device. Various examples may organize the memory 212 into particularized and, in some cases, unique structures to perform the functions disclosed herein. These data structures may be sized and organized to store values for particular data and types of data.

Components of the computer system 202 are coupled by an interconnection element such as the bus 214. The bus 214 may include one or more physical busses, for example, busses between components that are integrated within a same machine, but may include any communication coupling between system elements including specialized or standard computing bus technologies such as IDE, SCSI, PCI and InfiniBand. The bus 214 enables communications, such as data and instructions, to be exchanged between system components of the computer system 202.

The computer system 202 also includes one or more interface devices 216 such as input devices, output devices and combination input/output devices. Interface devices may receive input or provide output. More particularly, output devices may render information for external presentation. Input devices may accept information from external sources. Examples of interface devices include keyboards, mouse devices, trackballs, microphones, touch screens, printing devices, display screens, speakers, network interface cards, etc. Interface devices allow the computer system 202 to exchange information and to communicate with external entities, such as users and other systems.

The data storage 218 includes a computer readable and writeable nonvolatile, or non-transitory, data storage medium in which instructions are stored that define a program or other object that is executed by the processor 210. The data storage 218 also may include information that is recorded, on or in, the medium, and that is processed by the processor 210 during execution of the program. More specifically, the information may be stored in one or more data structures specifically configured to conserve storage space or increase data exchange performance. The instructions may be persistently stored as encoded signals, and the instructions may cause the processor 210 to perform any of the functions described herein. The medium may, for example, be optical disk, magnetic disk or flash memory, among others. In operation, the processor 210 or some other controller causes data to be read from the nonvolatile recording medium into another memory, such as the memory 212, that allows for faster access to the information by the processor 210 than does the storage medium included in the data storage 218. The memory may be located in the data storage 218 or in the memory 212, however, the processor 210 manipulates the data within the memory, and then copies the data to the storage medium associated with the data storage 218 after processing is completed. A variety of components may manage data movement between the storage medium and other memory elements and examples are not limited to particular data management components. Further, examples are not limited to a particular memory system or data storage system.

Although the computer system 202 is shown by way of example as one type of computer system upon which various aspects and functions may be practiced, aspects and functions are not limited to being implemented on the computer system 202 as shown in FIG. 2. Various aspects and functions may be practiced on one or more computers having a different architectures or components than that shown in FIG. 2. For instance, the computer system 202 may include specially programmed, special-purpose hardware, such as an application-specific integrated circuit (ASIC) tailored to perform a particular operation disclosed herein. While another example may perform the same function using a grid of several general-purpose computing devices running MAC OS System X with Motorola PowerPC processors and several specialized computing devices running proprietary hardware and operating systems.

The computer system 202 may be a computer system including an operating system that manages at least a portion of the hardware elements included in the computer system 202. In some examples, a processor or controller, such as the processor 210, executes an operating system. Examples of a particular operating system that may be executed include a Windows-based operating system, such as, Windows NT, Windows 2000 (Windows ME), Windows XP, Windows Vista or Windows 7 operating systems, available from the Microsoft Corporation, a MAC OS System X operating system available from Apple Computer, one of many Linux-based operating system distributions, for example, the Enterprise Linux operating system available from Red Hat Inc., a Solaris operating system available from Sun Microsystems, or a UNIX operating systems available from various sources. Many other operating systems may be used, and examples are not limited to any particular operating system.

The processor 210 and operating system together define a computer platform for which application programs in high-level programming languages are written. These component applications may be executable, intermediate, bytecode or interpreted code which communicates over a communication network, for example, the Internet, using a communication protocol, for example, TCP/IP. Similarly, aspects may be implemented using an object-oriented programming language, such as .Net, SmallTalk, Java, C++, Ada, or C # (C-Sharp). Other object-oriented programming languages may also be used. Alternatively, functional, scripting, or logical programming languages may be used.

Additionally, various aspects and functions may be implemented in a non-programmed environment, for example, documents created in HTML, XML or other format that, when viewed in a window of a browser program, can render aspects of a graphical-user interface or perform other functions. Further, various examples may be implemented as programmed or non-programmed elements, or any combination thereof. For example, a web page may be implemented using HTML while a data object called from within the web page may be written in C++. Thus, the examples are not limited to a specific programming language and any suitable programming language could be used. Accordingly, the functional components disclosed herein may include a wide variety of elements, e.g. specialized hardware, executable code, data structures or objects, that are configured to perform the functions described herein.

In some examples, the components disclosed herein may read parameters that affect the functions performed by the components. These parameters may be physically stored in any form of suitable memory including volatile memory (such as RAM) or nonvolatile memory (such as a magnetic hard drive). In addition, the parameters may be logically stored in a propriety data structure (such as a database or file defined by a user mode application) or in a commonly shared data structure (such as an application registry that is defined by an operating system). In addition, some examples provide for both system and user interfaces that allow external entities to modify the parameters, such as sponsor types and sectors, and thereby configure the behavior of the components.

Utility Cost Savings Processes

Figure 3:
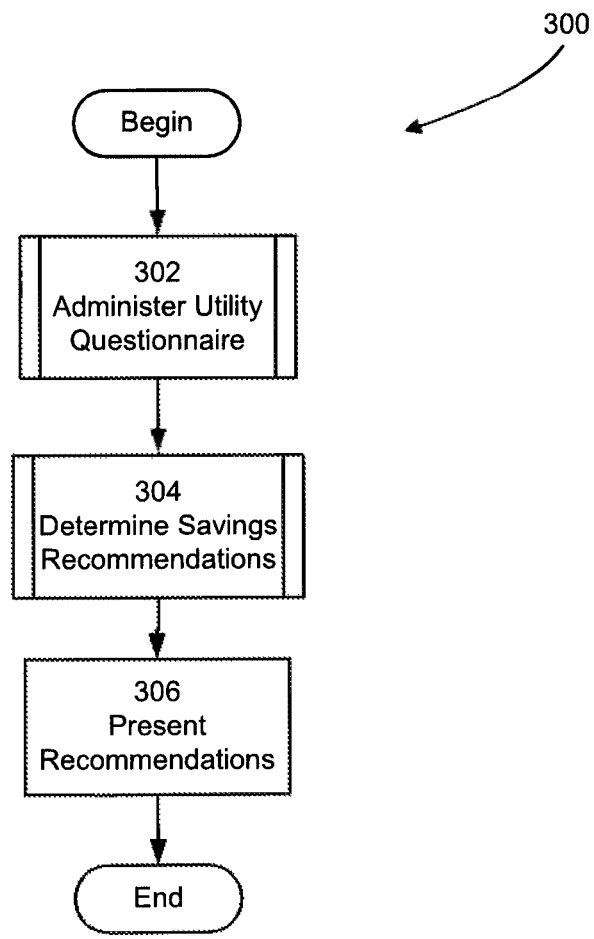
FIG. 3 is a flow diagram depicting a process for determining and presenting utility cost savings information.

Some examples perform processes for determining utility cost savings. One example of such a process is illustrated in FIG. 3. According to this example, a process 300 includes acts of administering a utility questionnaire, determining savings recommendations and presenting the recommendations to a user. For consumers of large amounts of one or more utilities, execution of the process 300 may result is a substantial reduction of utility costs.

In act 302, a utility questionnaire is administered to a user. In one example, a computer system, such as the utility cost saving system 100 described above with regard to FIG. 1, administers the questionnaire to an external entity, such as the user 102, via the user interface 126. One example of a process performed in the act 302 is described further below with reference to FIG. 4.

In act 304, savings recommendations are determined. In at least one example, the utility cost saving system 100 determines savings recommendations by executing the cost savings engine 124. One example of a process performed in the act 304 is described further below with reference to FIG. 5.

In act 306, recommendations are presented to a user. In one example, the user interface 126 presents recommendation information to the user 102. The recommendation information may include a variety of information, such as an identifier of one or more sites targeted by the recommendation information, recommended actions to be taken at the targeted sites and an indication of the savings expected as a result of taking the recommend actions. Two examples of user interface screens used to present recommendation information are described further below with reference to FIGS. 6 and 7. The process 300 ends after execution of the act 306.

Figure 4:
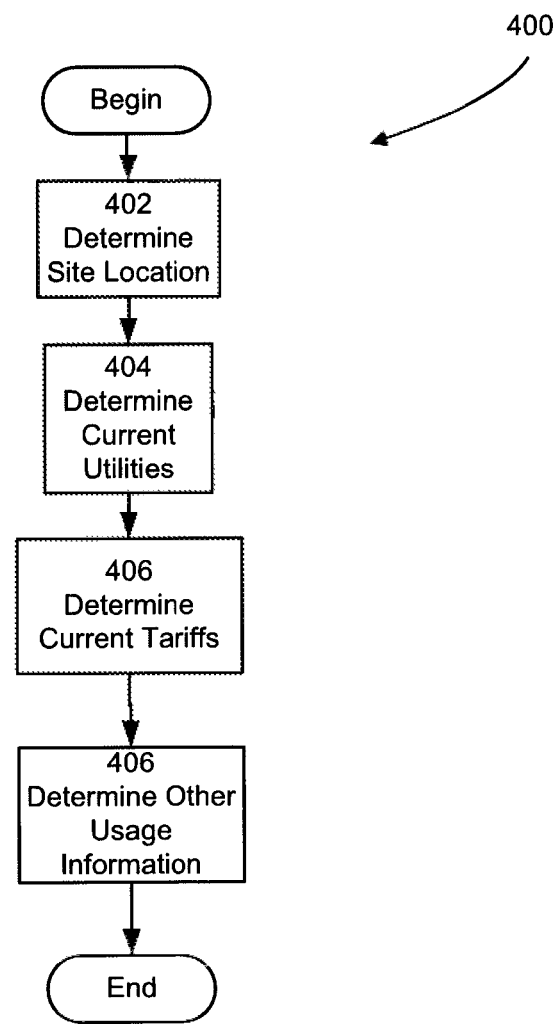
FIG. 4 is a flow diagram illustrating a process for administering a utility questionnaire.

As discussed above with reference to the act 302 of the process 300, some examples perform an act of administering a utility questionnaire to a user. FIG. 4 illustrates an exemplary process 400 for performing the act 302 in which a utility cost savings system, such as the utility cost savings system 100, implements the utility questionnaire in the form of an information gathering wizard. This information gathering wizard leads a user, such as the user 102, through the process of entering information used by the utility cost savings system to determine utility saving recommendations. As shown in FIG. 4, the process 400 includes acts of determining site location information for one or more sites, determining utilities that are currently consumed at the sites, determining the current tariffs applicable to the sites' utility consumption and determining utility usage characteristics of the sites.

In act 402, location information for one or more sites is determined. In one example, the utility cost savings system determines the location information using a user interface, such as the user interface 126. According to this example, the user interface presents one or more prompts to a user that request the location information. This location information may include information specifying a country, state, and city or other locality. Upon receipt of the location information, the user interface stores the location information within a usage data store, such as the usage data store 122.

In act 404, utilities consumed at the sites are determined. In one example, the user interface presents one or more prompts to the user that request the information specifying the utilities consumed at the sites. The utilities consumed at the site may include electricity, gas, water, telecommunications or other commodities that are provided by a utility company. In this example, the prompts restrict utilities available for selection by the user based on information stored in the usage data store that specifies the utilities that are available at the location of each site as specified in the act 402. Upon receipt of the information specifying the utilities consumed at the sites, the user interface stores the information within the usage data store.

In act 406, tariffs under which the utilities are consumed are determined. In one example, the user interface presents one or more prompts to the user that request the tariff information. According to this example, the prompts restrict the tariffs available for selection by the user based on information stored in the usage data store that specifies the tariffs potentially applicable to the utilities consumed at the site. Upon receipt of the information specifying the tariffs applicable to the sites, the user interface stores the information within the usage data store.

In act 408, other usage information is determined. In one example, the user interface presents one or more prompts to the user that request the other usage information. According to this example, the prompts restrict the other usage information requested to information that impacts the amount of utilities consumed at the site. Examples of the usage information for which the user interface may prompt the user include information specifying onsite equipment and information specifying the physical layout of the site as described above with reference to the data store 122. Further, in this act, the prompts may include questions to determine whether the site can alter its utility usage pattern, whether the site has a building management system installed, whether the site has a generator (and if not, whether the site has space available to install a generator) and what the source for temperature control is for the site. Other examples may determine other usage information and examples are not limited to particular sets of usage information. Upon receipt of the other usage information for the sites, the user interface stores the usage information within the usage data store.

Figure 5:
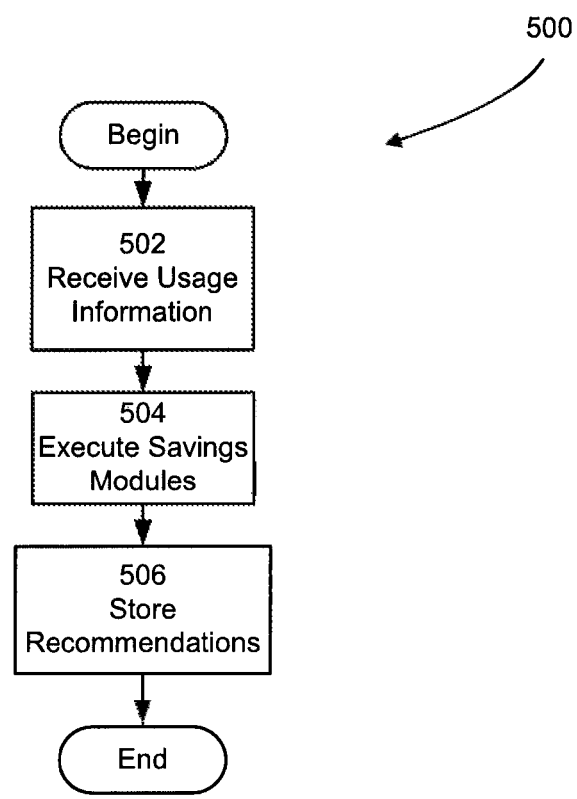
FIG. 5 is a flow diagram illustrating a process for determining potential utility savings.

As discussed above with reference to the act 304 of the process 300, some examples perform an act of determining utility cost savings recommendations. FIG. 5 illustrates an exemplary process 500 for performing the act 304 in which a utility cost savings system, such as the utility cost savings system 100, uses a cost savings engine, such as the cost savings engine 124, to determine the savings recommendations. As shown in FIG. 5, the process 500 includes acts of receiving site information, executing savings modules and storing the resulting recommendations.

In act 502, usage information is received. In one example, the cost savings engine receives the usage information from a usage data store, such as the usage data store 122. Upon receipt of the usage information, the cost savings engine executes one or more cost savings modules in act 504. In this example, the cost savings modules include a contract demand optimization module, a power factor correction module, and energy shifting module, a tariff optimization module, demand response participation module, a green on-site generation module, a fuel on-site generation module, a real-time pricing analysis module, a deregulated market module, a peak shaving module, an energy reduction module and a lighting retrofit module.

Figure 10:
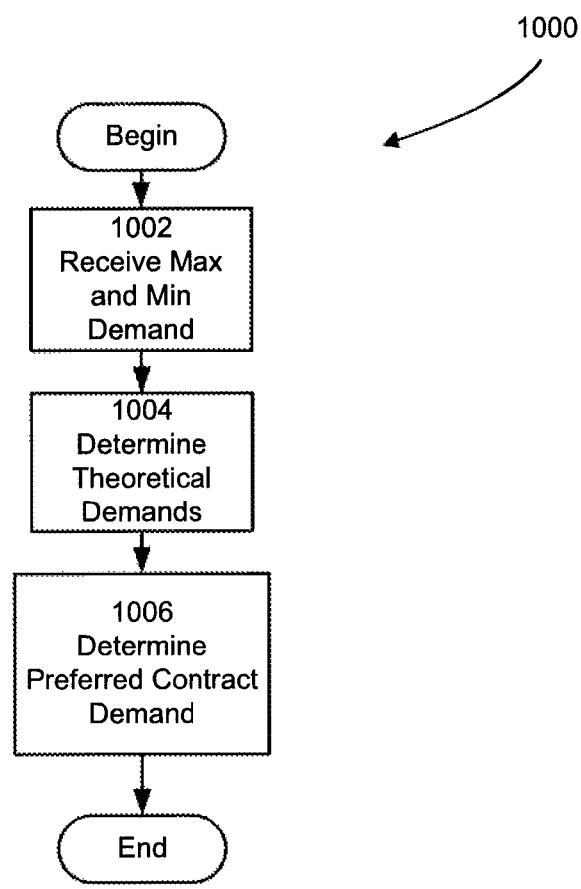
FIG. 10 is a flow diagram illustrating a process for determining preferred contract demands.

When executing the contract demand optimization module, the cost savings engine determines a preferred contract demand for each site by executing the following process, which is illustrated in FIG. 10 by the process 1000. First, in act 1002 the cost savings engine retrieves, from the usage data store, the minimum demand and the maximum demand over one or more specified time periods for each site. In some examples, demand values are computed from meter reading information. In other examples, the specified time periods will correspond to one or more time intervals that share a common rate within the contract period. For instance, where the contract period is 1 year and utility service is offered according to time of use tariffs with two different rates corresponding to two different consumption time intervals within each day, the cost savings engine retrieves the minimum demand and the maximum demand that occurred within each of the two time intervals over the last year. In another example where the contract period is 6 months, the cost savings engine will retrieve minimum and maximum values for the same 6 months from the previous year.

Next, in act 1004 the cost savings engine determines a plurality of theoretical contract demands based on the minimum demand and the maximum demand. For instance, in one example, the cost savings engine calculates a range of N discrete theoretical contract demand values between $C_1^*$ (the minimum demand) and $C_2^*$ (the maximum demand), where N=100, $C_1$=0.8 and $C_2$=1.2. Then, in act 1006 the cost savings engine computes projected utility consumption costs for each of the discrete theoretical contract demand values using actual historical demand, identifies the theoretical contract demand value with the lowest projected cost as the preferred contract demand value and includes the preferred contract demand value (and the associated, potential cost savings amounts) within the recommendation information. These potential cost savings amounts may reflect the difference between the projected utility consumption costs and actual historical utility consumption costs derived from the actual historical demand. While, in this example, N=100, $C_1$=0.8 and $C_2$=1.2, examples are not limited to these constants. Other examples may employ other constants or variables based on the minimum demand or the maximum demand encountered over the contract period.

Figure 11:
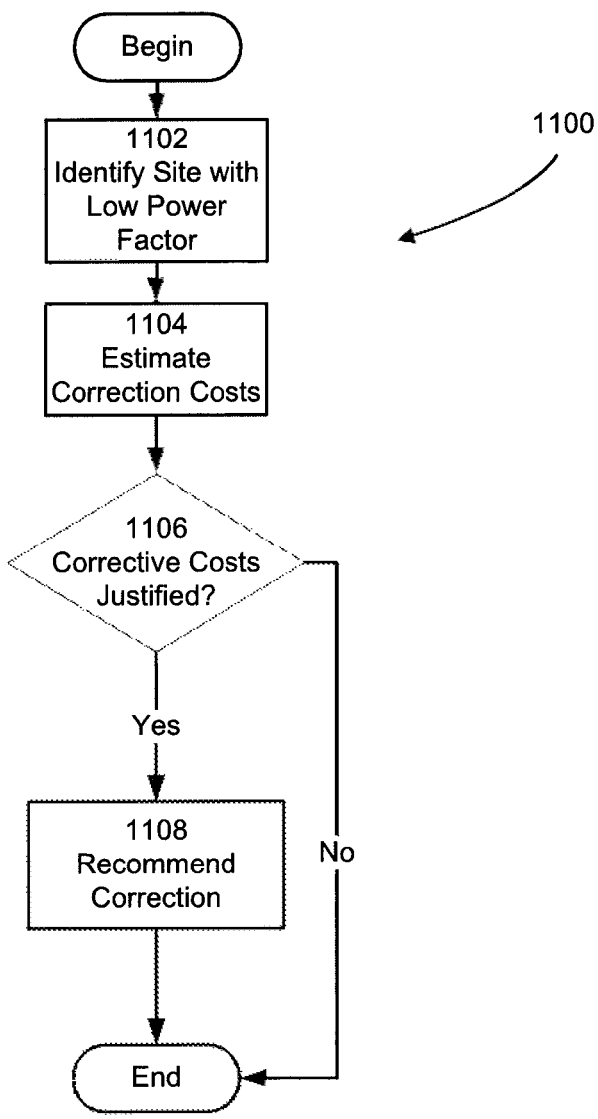
FIG. 11 is a flow diagram illustrating a process for determining power factor recommendations.

FIG. 11 illustrates a process 1100 in which the cost savings engine executes the power factor correction module. When executing the power factor correction module, in act 1102, the cost savings engine determines whether any sites have a power factor sufficiently low to cause the sites to incur a power factor charge. If so, the cost savings engine estimates the cost of corrective action in act 1104. Next, in act 1106 the cost savings engine determines whether the cost of corrective action is justified by the corresponding decrease in the power factor charge. If so, the cost savings engine will include taking the corrective action (and the potential cost savings of doing so) within the recommendation information in act 1108.

According to another example, the cost savings engine executes the power factor correction module as follows. First, the cost savings engine retrieves, from the usage data store, information indicative of real energy and reactive energy meter readings for the main entrance meter of each site. The cost savings engine also retrieves the utility tariff information from the usage data store that specifies how power factor charges are determined for each site. Next, the cost savings engine calculates the power factor charges for the previous billing cycle (e.g. the previous month). Then the cost savings engine determines whether the power factor charges are greater than 0. If so, then the cost savings engine adds power factor correction and the potential savings of the calculated power factor charges to the recommendation information.

In other examples, while executing the power factor correction module, the cost savings engine includes the power factor from the previous billing cycle within the recommendation information. In this situation, the power factor included is the reported power factor that resulted in power factor charges (for example, the power factor at a time of peak demand, the average power factor over the billing cycle or the minimum power factor measured during the billing cycle). Also, in this example, the cost savings engine retrieves the reported power factor from tariff information stored in the usage data store.

According to another example, the cost savings engine determines an ideal power factor for each site when running the power factor correction module. In this example, the ideal power factor is the lowest power factor that the site may exhibit without incurring power factor charges. Further, in this example, the cost savings engine includes the ideal power factor within the recommendation information.

According to another example, when running the power factor correction module, the cost savings engine determines a return on investment (ROI) for investing in power factor correction. In this example, the cost savings engine calculates the maximum kvar allowed, determines the cost of suitable power factor correction hardware and calculates the ROI based on the cost of the power correction hardware versus the concomitant decrease in the power factor charges. Further, in this example, the cost savings engine includes the ROI within the recommendation information.

In another example, when executing the power factor correction module, the cost savings engine determines the one or more preferred locations for power factor correction equipment within the power distribution path. In this example, the cost savings engine calculates the power factor at each sub-meter within the power path of the site. Next, the cost savings engine identifies (based on the calculated power factors and, in some cases, other considerations) one or more preferred locations within the power path for power factor correction equipment. These other consideration may include, for instance, the results of a harmonic distortion analysis that may exclude certain locations from the set of preferred locations. Once the preferred locations are determined, the cost savings engine may include the preferred locations within the recommendation information. Also, in some examples, the cost savings engine may determine a cost savings associated with deploying the power factor correction equipment to the preferred locations. In these examples, the cost saving is based on the additional longevity and reliability of the equipment due to the presence of the power factor correction equipment.

In another example, when executing the tariff optimization module, the cost savings engine analyzes site data and determines a preferred tariff for each site. To make this determination, the cost savings engine retrieves information representative of tariffs available at each site, the current tariff for each site, contract parameters covering each site, such as the current contract demand, and the site usage of the utility, such as real energy and reactive energy meter readings, if such is required to determine the cost of utility service. The cost savings engine then executes a process for determining a preferred tariff for each site. One such process is illustrated in FIG. 8 as process 800.

Figure 8:
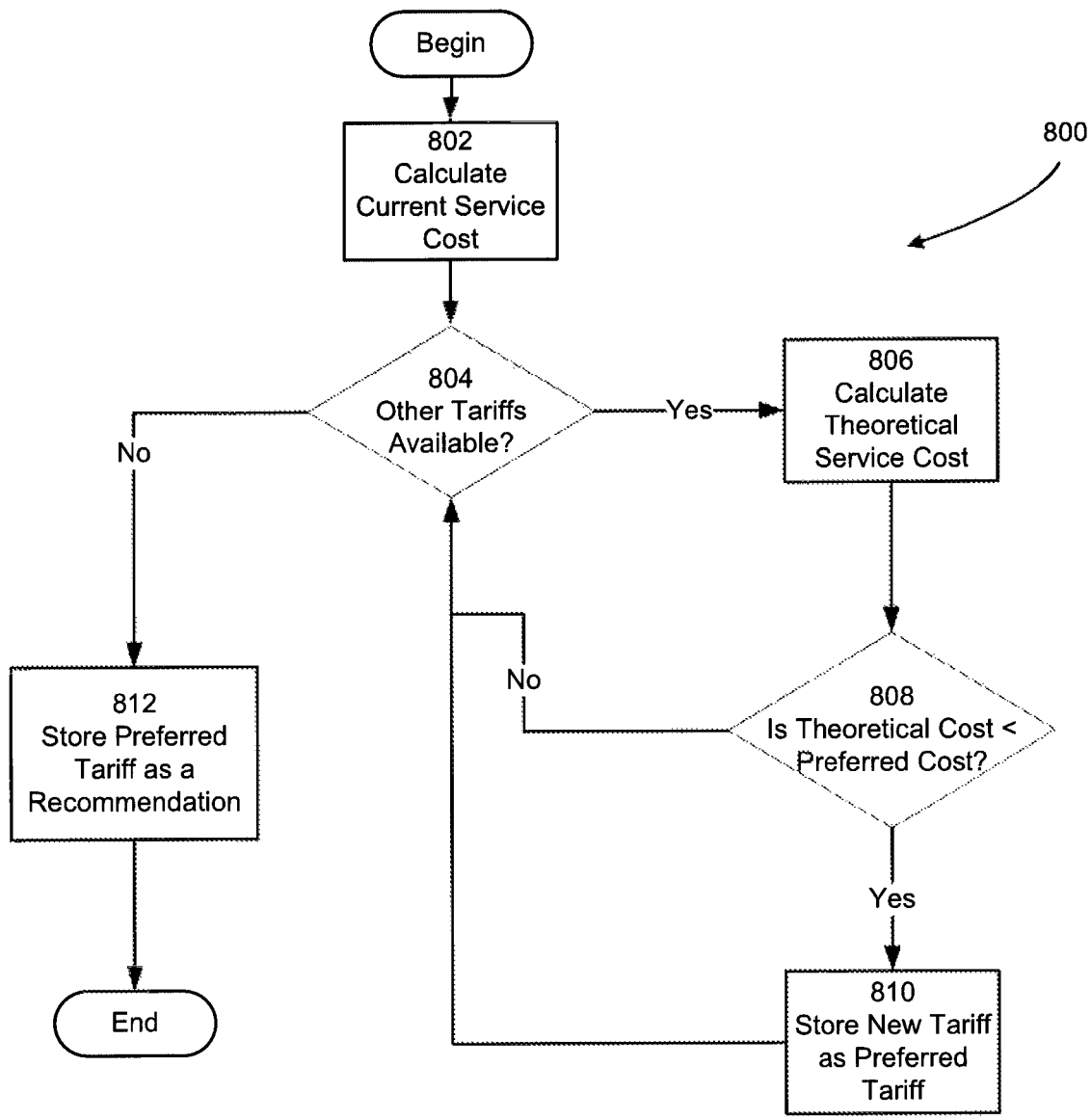
FIG. 8 is a flow diagram illustrating a process for determining preferred tariffs.

As shown in FIG. 8, the cost savings engine begins the process 800 in act 802 by calculating the cost of service under the current tariff and storing this tariff as the preferred tariff. Next, in act 804, the cost savings engine determines whether there are other tariffs available at the site. If so, the cost savings engine calculates a theoretical cost of service under the next available tariff in act 806. Otherwise, the cost savings engine includes the preferred tariff (and the potential cost savings of doing so) within the recommendation information in act 812 and the process 800 ends. In act 808, the cost savings engine compares the cost of service under the preferred tariff to the theoretical cost of service under the next tariff and determines whether the theoretical cost of service is less than the cost of service under the preferred tariff. If so, the cost savings engine stores the new tariff as the preferred tariff and returns to the act 804.

Figure 13:
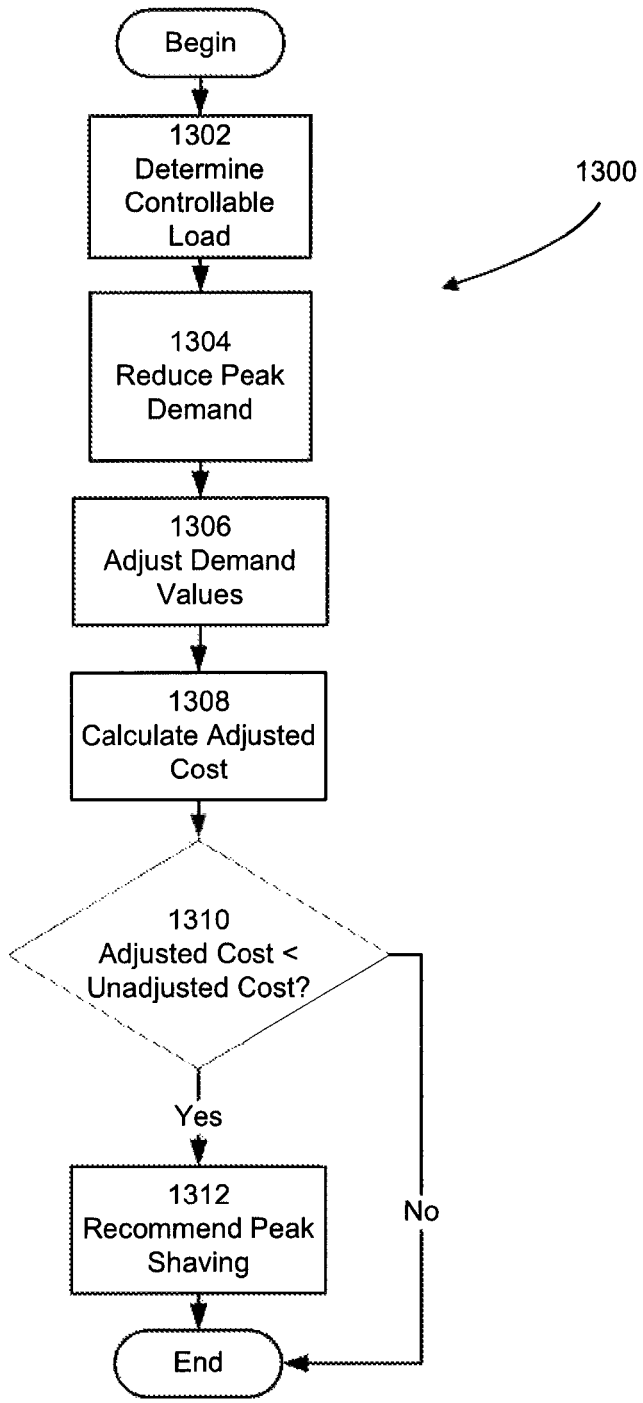
FIG. 13 is a flow diagram illustrating a process for determining peak shaving recommendations.

FIG. 13 illustrates a process 1300 in which the cost savings engine executes the peak shaving module. When executing the peak shaving module, the cost savings engine analyzes site data and determines the cost savings potential of reducing peak demand by a specified percentage. This decrease in demand may be accomplished through adjustment of one or more controllable loads, such as lighting and environmental control systems. In some examples, these controllable loads are automatically adjusted via a building management system. In other examples, the decrease in demand may be accomplished by operation of on-site utility generation equipment.

To determine the potential cost savings of decreasing peak demand, in act 1302 the cost savings engine retrieves information representative of the load that can be controlled at each site, the current tariff for each site and the site usage of the utility, such as real energy and reactive energy meter readings for a period of time. In some examples, the information representative of the controllable load is expressed as a percentage, for example 5%. In other examples, the information representative of the controllable load is expressed as a demand value. In at least one example, the controllable load is calculated by performing a regression analysis on the load demand curve for a site. In another example, the cost savings engine determines the demand value by which the peak demand may be reduced by retrieving information indicating the utility generation capacity of utility generation equipment that is available on-site.

Next, in act 1304 the cost savings engine finds the peak demand for the last billing cycle and reduces the peak demand by the controllable load. Then, in act 1306 the cost savings engine adjusts any demand values within the time period so that no demand value exceeds the adjusted peak demand. After the cost savings engine finishes these demand adjustments, in act 1308 the cost savings engine calculates an adjusted cost of service for the time period using the adjusted demand and calculates an unadjusted cost of service for the time period using the unadjusted demand. Next, in act 1310 the cost savings engine compares adjusted cost of service with the unadjusted cost of service and if the adjusted cost of service is less than the unadjusted cost of service, in act 1312 the cost savings engine includes the reduced peak demand (and the potential cost savings thereof) within the recommendation information.

Figure 12:
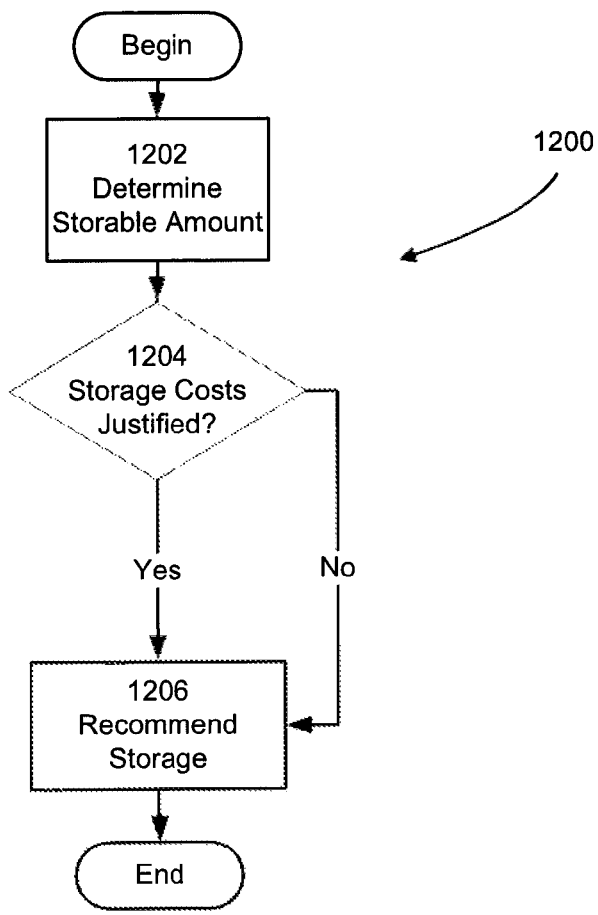
FIG. 12 is a flow diagram illustrating a process for determining energy shifting recommendations.

FIG. 12 illustrates a process 1200 in which the cost savings engine executes the energy shifting module. When executing the energy shifting module, in act 1202 the cost savings engine analyzes site data and determines an amount of the utility that can be received and stored on-site during time periods having lower rates and then later consumed during time periods having higher rates. Next, in act 1204 the cost savings engine determines whether the savings resulting from shifting the consumption of the utility justifies the cost of utility storage equipment and other associated storage costs. In one example, the cost savings engine determines whether the savings justifies the cost by calculating a difference between the savings and the cost and comparing the difference to a threshold payback amount. In this example, the savings is the difference between the cost of the amount consumed at the higher rate and the cost of the amount consumed at the lower rate. If shifting consumption is justified, in act 1206 the cost savings engine includes a recommendation to purchase the utility storage equipment (and the potential cost savings thereof) within the recommendation information.

Figure 14:
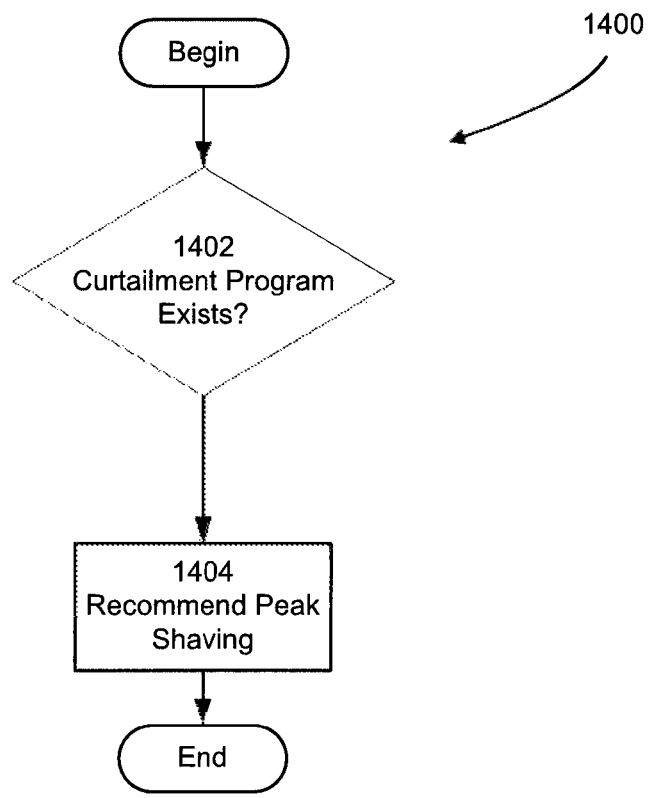
FIG. 14 is a flow diagram illustrating a process for determining preferred demand response programs.

FIG. 14 illustrates a process 1400 in which the cost savings engine executes the demand response program participation module. When executing the demand response program participation module, in act 1402 the cost savings engine analyzes site data and determines the potential cost savings for participating in a curtailment program through a utility company or aggregator. In this example, the cost savings engine analyzes the curtailment programs available to the site. If potential cost savings exists, in act 1404 the cost savings engine includes a recommendation to enter the curtailment program (and the potential cost savings thereof) within the recommendation information. In one example, the cost savings engine determines potential savings exists if the site can comply with the requirements of the curtailment program without modifying utility consumption, as recorded in the usage history.

Figure 15:
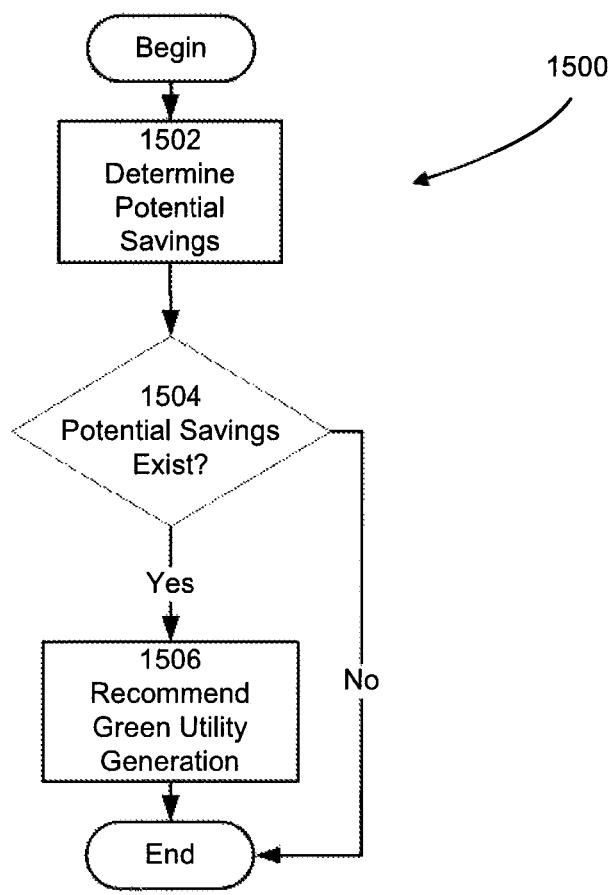
FIG. 15 is a flow diagram illustrating a process for determining green on-site utility generation recommendations.

FIG. 15 illustrates a process 1500 in which the cost savings engine executes the green on-site generation module. When executing the green on-site generation module, in act 1502 the cost savings engine determines the potential cost savings for installing and operating a solar panel, wind turbine or other alternative, non-fossil fuel based, utility generation device on-site. In act 1504, the cost savings engine determines whether potential cost savings exists. If so, the cost savings engine includes a recommendation to install the utility generation device (and the potential cost savings thereof) within the recommendation information in act 1506. In one example, the cost savings engine determines that potential cost savings exists where the cost of installing and operating the green utility generation module is less than historical utility consumption costs by a predefined margin.

Figure 16:
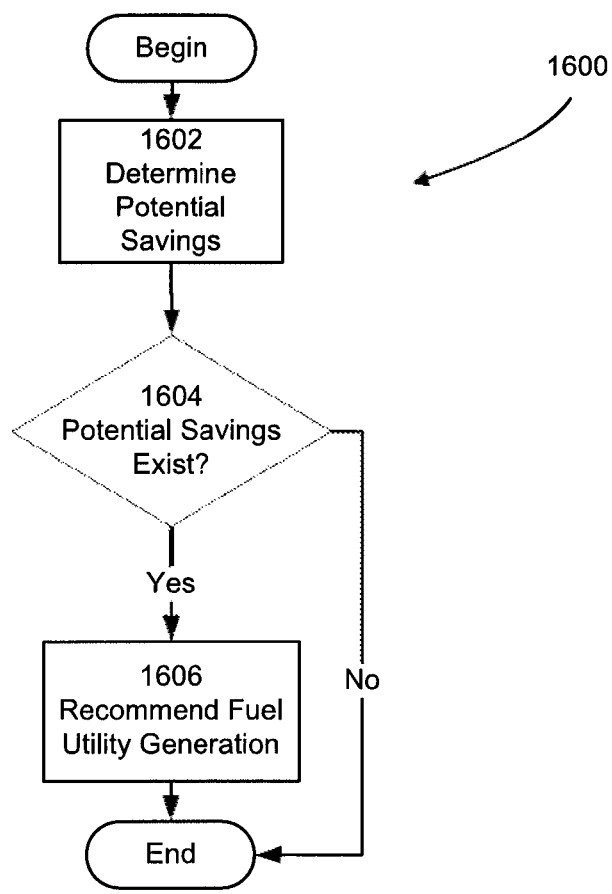
FIG. 16 is a flow diagram illustrating a process for determining fuel on-site utility generation recommendations.

FIG. 16 illustrates a process 1600 in which the cost savings engine executes the fuel on-site generation module. When executing the fuel on-site generation module, in act 1602 the cost savings engine determines the potential cost savings for installing and operating a fossil fuel based utility generation device on-site. In act 1604, the cost savings engine determines whether potential cost savings exists. If so, the cost savings engine includes a recommendation to install the utility generation device (and the potential cost savings thereof) within the recommendation information in act 1606. In one example, the cost savings engine determines that potential cost savings exists where the cost of installing and operating the fuel utility generation module is less than historical utility consumption costs by a predefined margin.

Figure 17:
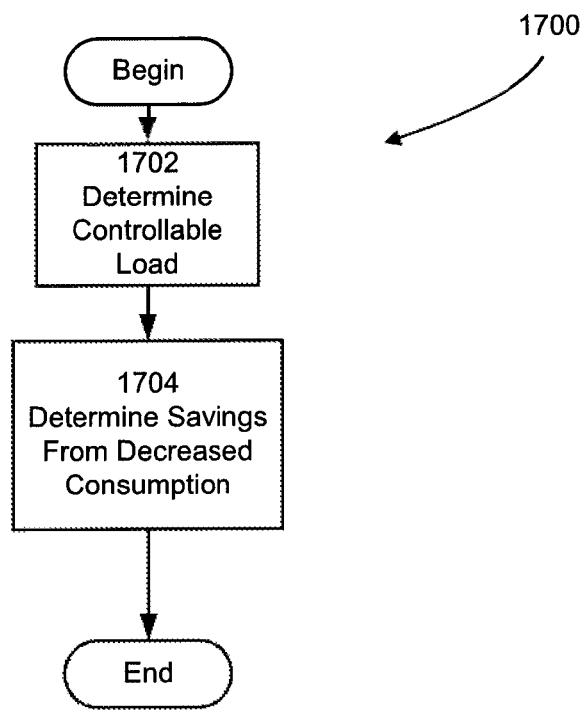
FIG. 17 is a flow diagram illustrating a process for determining real-time pricing analysis recommendations.

FIG. 17 illustrates a process 1700 in which the cost savings engine executes the real-time pricing analysis module. When executing the real-time pricing analysis module, the cost savings engine analyzes site data and determines the potential cost saving of curtailing the load at the site during periods having higher rates. As with peak shaving, when executing the real-time pricing analysis module, the cost savings engine determines the controllable load of each site and determines how much consumption of the utility can be reduced and for how long in act 1702. Next, in act 1704 the cost savings engine determines the potential savings resulting from the reduced consumption and includes a recommendation to reduce consumption (and the potential cost savings thereof) within the recommendation information.

In another example, when executing the deregulated market module, the cost savings engine analyzes site data and determines a preferred utility service offering for each site. Utility service offerings may be offered by a single utility company that competes with the current utility company servicing a site or may be any combination of utility products (transmission, distribution, etc . . . ) offered by multiple utility companies. To determine if adoption of a new service offering would result in cost savings, the cost savings engine retrieves information representative of service offerings available at the each site, the current service offering for each site, contract parameters covering each site, such as the current contract demand, and the site usage of the utility, such as real energy and reactive energy meter readings, if such is required to determine the cost of the service offering. The cost savings engine then executes a process for determining a preferred service offering for each site. One such process is illustrated in FIG. 9 as process 900.

Figure 9:
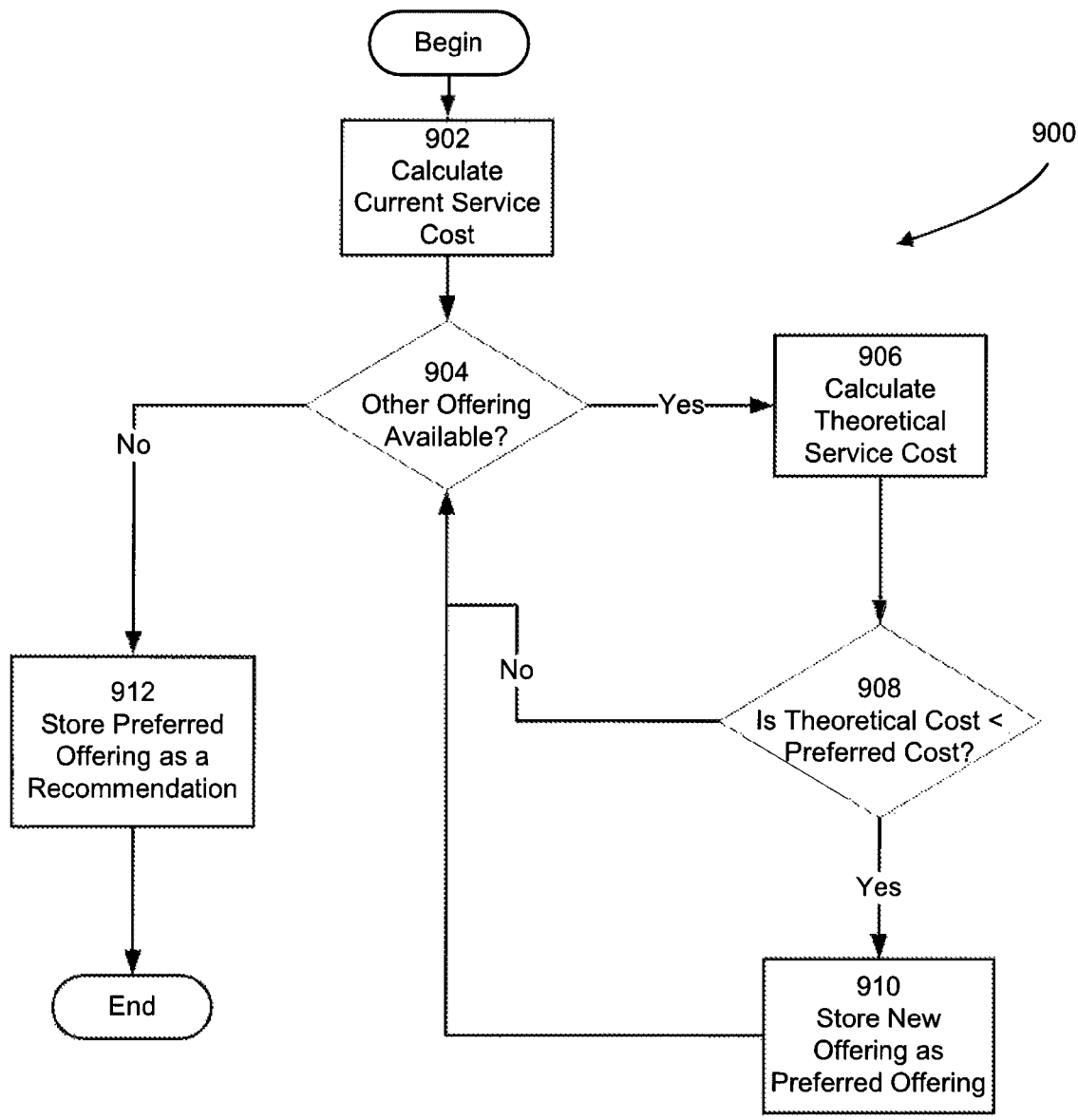
FIG. 9 is a flow diagram illustrating a process for determining preferred service offerings.

As shown in FIG. 9, the cost savings engine begins the process 900 in act 902 by calculating the cost of service under the current service offering and storing this service offering as the preferred service offering. Next, in act 904, the cost savings engine determines whether there are other service offerings available at the site. If so, the cost savings engine calculates a theoretical cost of service under the next available service offering in act 906. Otherwise, the cost savings engine includes the preferred service offering (and the potential cost savings of doing so) within the recommendation information in act 912 and the process 900 ends. In act 908, the cost savings engine compares the cost of service under the preferred service offering to the theoretical cost of service under the next available service offering and determines whether the theoretical cost of service is less than the cost of service under the preferred service offering. If so, the cost savings engine stores the new service offering as the preferred service offering and returns to the act 904.

Figure 18:
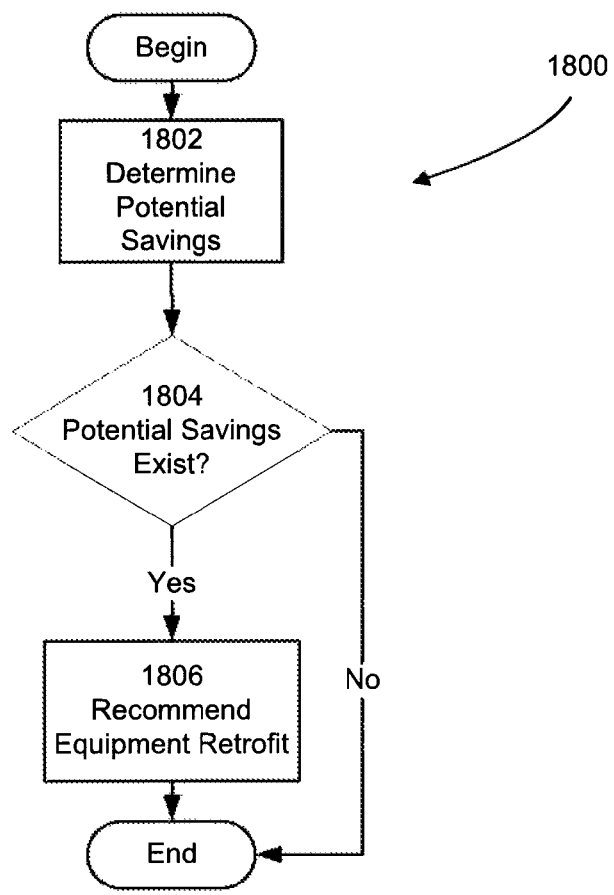
FIG. 18 is a flow diagram illustrating a process for determining lighting retrofit recommendations.

FIG. 18 illustrates a process 1800 in which the cost savings engine executes the lighting retrofit module. When executing the lighting retrofit module, in act 1802 the cost savings engine determines the potential cost savings for installing and operating new lights. In act 1804, the cost savings engine determines whether potential cost savings exists. Is so, the cost savings engine includes a recommendation to install the new lights (and the potential cost savings thereof) within the recommendation information in act 1806. In one example, the cost savings engine determines that potential cost savings exists where the cost of installing and operating the new lights is less than cost of operating the currently installed lights by a predefined margin. In some examples, the cost savings engine calculates the cost of operating the currently installed lights as a percentage of the amount of the overall utility consumption (as reflected in the usage data). In other examples, the cost savings engine determines the cost of operating installed lights by analyzing usage data associated with meters that record power used by the currently installed lights. Although the example illustrated in FIG. 18 is directed toward lights, other examples determine potential cost savings for other types of equipment, such as heating and cooling equipment.

Figure 19:
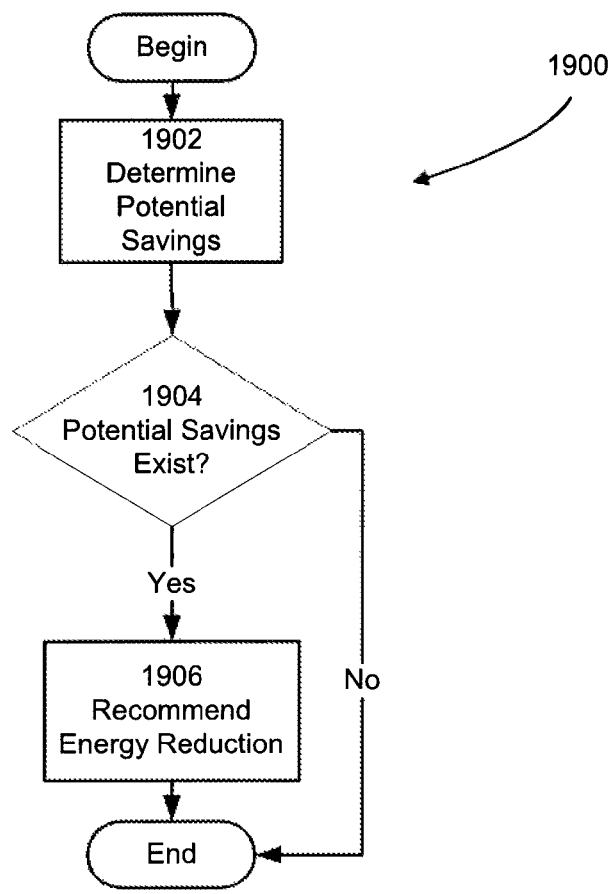
FIG. 19 is a flow diagram illustrating a process for determining energy reduction recommendations.

FIG. 19 illustrates a process 1900 in which the cost savings engine executes the energy reduction module. When executing the energy reduction module, in act 1902 the cost savings engine determines the potential cost savings for reducing energy consumption. The potential cost savings determined by the cost savings engine may include tax incentives, subsidies or rebates provided for installation and operation of green energy sources. In act 1904, the cost savings engine determines whether potential cost savings exists. Is so, the cost savings engine includes a recommendation to reduce energy consumption (and the potential cost savings thereof) within the recommendation information in act 1906. In one example, the cost savings engine determines that potential cost savings exists where the cost of installing and operating the green energy source minus tax incentives, subsidies or rebates is less than historical utility consumption costs by a predefined margin.

Figure 6:
FIG. 6 is an exemplary interface display configured to provide cost savings recommendations.

FIGS. 6 and 7 illustrate two exemplary screens used to present recommendation information to a user via the user interface 126. FIG. 6 presents a summary of the utility cost savings expected if the recommendations are followed, which in this case totals $219,446.16. FIG. 7 includes a table 700 that presents a list of recommended actions by site. As shown in FIG. 7, the table 700 includes a site column 702, best rate (optimal tariff) column 704, a power factor column 706 and a peak demand column 708. The site column 702 lists the sites analyzed by the cost savings engine. The best rate column 704, the power factor column 706 and the peak demand column 708 each list the potential savings determined by the cost savings engine as a result of executing the corresponding modules described above. According to the recommendation information displayed in FIG. 7, the utility cost savings system was unable to identify cost savings opportunities by changing tariffs or altering the power factor for any of the sites. However, in this example, the utility cost savings system was able to identify significant utility costs savings opportunities for each site by shaving the peak demand of each site. In addition, because the table 700 displays costs savings recommendations across a plurality of sites, differences in utility costs between sites having otherwise similar physical layouts and equipment may be explained by the table 700. For instance, the table 700 may display fewer recommendations for a first site that efficiently consumes a utility than for a second site that is inefficiently consumes the utility even though they have a similar physical layout and age. This disparity in cost savings recommendations may explain the reason or reasons for the difference in utility costs for the sites and may identify the best opportunities for decreased utility costs.

Having thus described several aspects of at least one example, it is to be appreciated that various alterations, modifications, and improvements will readily occur to those skilled in the art. Such alterations, modifications, and improvements are intended to be part of this disclosure, and are intended to be within the scope of the examples discussed herein. Accordingly, the foregoing description and drawings are by way of example only.

What is claimed is:

1. A computer system for identifying utility cost savings, the computer system comprising:
   a memory;
   and at least one processor coupled to the memory, the at least one processor being configured to:
   receive usage information gathered from at least one site via a first utility meter interface including information related to a controllable load;
   administer a utility questionnaire via a user interface;
   determine recommendation information describing a plurality of cost savings recommendations for the at least one site based on a set of responses to the questionnaire, and the usage information;
   determine an amount by which consumption of a utility can be reduced during a period of time at the at least one site;
   calculate a savings based on the amount and the period of time;
   include, in the recommendation information, information describing the amount and the period of time;
   calculate information related to a controllable load of the at least one site;
   identify a peak demand for the utility that occurred at the at least one site during a previous billing cycle;
   adjust the peak demand by the controllable load to create an adjusted peak demand;
   adjust demand values reported within the previous billing to not exceed the adjusted peak demand to create adjusted demand values;
   calculate an adjusted cost for the previous billing cycle using the adjusted demand values; and
   include, in the recommendation information responsive to the adjusted cost being lower than an unadjusted cost, information describing the controllable load; and
   automatically controlling, by the at least one processor via operation of a building management system, the controllable load based on the recommendation information.

2. The computer system according to claim 1, wherein the at least one processor is further configured to present the recommendation information to an external entity.

3. The computer system according to claim 1, wherein the at least one processor configured to administer the utility questionnaire is configured to:
   request utility information from a user via the user interface; and
   receive the utility information from the user via the user interface.

4. The computer system according to claim 3, wherein the at least one processor configured to request utility information is configured to:
   request location information for the at least one site;
   request information identifying at least one utility consumed at the at least one site; and
   request information identifying at least one tariff applicable to the at least one utility.

5. The computer system according to claim 1, wherein the at least one processor configured to determine recommendation information is configured to:
   determine a plurality of theoretical contract demand values for the at least one site;
   compute a plurality of costs using the plurality of theoretical contract demand values, each of the plurality of theoretical contract demand values corresponding to a respective one of the plurality of costs; and
   include, in the recommendation information, information describing at least one of the plurality of theoretical contract demand values corresponding to a respective at least one of the plurality of costs that is lower than others of the plurality of costs.

6. The computer system according to claim 1, wherein the at least one processor configured to determine recommendation information is configured to:
   determine a power factor value for the at least one site;
   determine whether at least one tariff applicable to the at least one site specifies a power factor charge for the power factor value; and
   include, in the recommendation information responsive to determining that a power factor charge is specified, information describing the power factor charge.

7. The computer system according to claim 1, wherein the at least one processor configured to determine recommendation information is configured to:
   determine a storable amount of a utility that can be stored at the at least one site;
   calculate a savings based on a consumable amount of the utility that can be consumed from the storable amount;

calculate a difference between a cost of storing the storable amount and the savings;
compare the difference to a threshold; and
include, in the recommendation information responsive to the difference being beyond the threshold, information describing storing the storable amount.

8. The computer system according to claim 1, wherein the at least one processor configured to determine recommendation information is configured to:
identify a plurality of tariffs applicable to the at least one site;
compute a plurality of costs using the plurality of tariffs, each of the plurality of tariffs corresponding to a respective one of the plurality of costs; and
include, in the recommendation information, information describing at least one of the plurality of tariffs corresponding to a respective at least one of the plurality of costs that is lower than others of the plurality of costs.

9. The computer system according to claim 1, wherein the at least one processor configured to determine recommendation information is configured to:
identify at least one curtailment program applicable to the at least one site; and
include, in the recommendation information, information describing the at least one curtailment program.

10. The computer system according to claim 1, wherein the at least one processor configured to determine recommendation information is configured to:
calculate a cost of producing a producible amount of a utility that can be produced at the at least one site;
calculate a savings of consuming the producible amount;
calculate a difference between the cost and the savings; and
include, in the recommendation information responsive to the savings being greater than the cost, information describing producing the producible amount.

11. The computer system according to claim 10, wherein the at least one processor configured to calculate the cost of producing the producible amount is configured to calculate a cost of producing the producible amount using at least one of a fossil fuel based utility generation device and an alternative utility generation device.

12. The computer system according to claim 1, wherein the at least one processor configured to determine recommendation information is configured to:
identify a plurality of service offerings applicable to the at least one site;
compute a plurality of costs based on the plurality of service offerings, each of the plurality of service offerings corresponding to a respective one of the plurality of costs; and
include, in the recommendation information, information describing at least one of the plurality of service offerings corresponding to a respective at least one of the plurality of costs that is lower than others of the plurality of costs.

13. The computer system according to claim 1, wherein the at least one processor configured to determine recommendation information is configured to:
calculate a difference between a cost of installing and operating new equipment at the at least one site for a period of time and a cost of operating current equipment at the at least one site for the period of time;
compare the difference to a threshold; and
include, in the recommendation information responsive to the difference being beyond the threshold, information describing installing and operating the new equipment.

14. The computer system according to claim 13, wherein the at least one processor configured to calculate the difference between the cost of installing and operating new equipment at the at least one site for a period of time and a cost of operating current equipment at the at least one site for the period of time is configured to calculate a difference between the cost of installing and operating new lighting at the at least one site for a period of time and a cost of operating current lighting at the at least one site for the period of time.

15. A method of identifying utility cost savings using a computer system, the computer system including memory and at least one processor coupled to the memory, the method comprising:
receiving, via a system interface coupled to the at least one processor, usage information gathered from at least one site via a first utility meter interface including information related to a controllable load;
administering, via a user interface coupled to the at least one processor, a utility questionnaire;
determining recommendation information describing a plurality of cost savings recommendations for the at least one site based on a set of responses to the questionnaire and the usage information;
determining an amount by which consumption of a utility can be reduced during a period of time at the at least one site;
calculating a savings based on the amount and the period of time;
including, in the recommendation information, information describing the amount and the period of time;
calculating information related to a controllable load of the at least one site;
identifying a peak demand for the utility that occurred at the at least one site during a previous billing cycle;
adjusting the peak demand by the controllable load to create an adjusted peak demand;
adjusting demand values reported within the previous billing to not exceed the adjusted peak demand to create adjusted demand values;
calculating an adjusted cost for the previous billing cycle using the adjusted demand values; and
including, in the recommendation information responsive to the adjusted cost being lower than an unadjusted cost, information describing the controllable load; and
controlling, automatically by the computer system via operation of a building management system, the controllable load based on the recommendation information.

16. The method according to claim 15, further comprising presenting the recommendation information to an external entity.

17. A non-transitory computer readable medium having stored thereon sequences of instruction for identifying utility cost savings including instructions that will cause at least one processor to:
receive, via a system interface coupled to the at least one processor, usage information gathered from at least one site via a first utility meter interface including information related to a controllable load;
administer, via a user interface coupled to the at least one processor, a utility questionnaire;
determine recommendation information describing a plurality of cost savings recommendations for the at least one site based on a set of responses to the questionnaire and the usage information;

determine an amount by which consumption of a utility can be reduced during a period of time at the at least one site;
calculate a savings based on the amount and the period of time;
include, in the recommendation information, information describing the amount and the period of time;
calculate information related to a controllable load of the at least one site;
identify a peak demand for the utility that occurred at the at least one site during a previous billing cycle;
adjust the peak demand by the controllable load to create an adjusted peak demand;
adjust demand values reported within the previous billing to not exceed the adjusted peak demand to create adjusted demand values;
calculate an adjusted cost for the previous billing cycle using the adjusted demand values;
include, in the recommendation information responsive to the adjusted cost being lower than an unadjusted cost, information describing the controllable load; and
automatically control, by the at least one processor, the controllable load based on the recommendation information via operation of a building management system.

18. The computer readable medium according to claim 17, wherein the sequences of instruction include instructions that will further cause the at least one processor to present the recommendation information to an external entity.

* * * * *